United States Patent
Taori et al.

(10) Patent No.: US 8,055,188 B2
(45) Date of Patent: Nov. 8, 2011

(54) RELAY SYSTEM AND DATA FRAME STRUCTURE FOR THE RELAY SYSTEM

(75) Inventors: Rakesh Taori, Gyeonggi-do (KR); Young-Doo Kim, Seoul (KR); Sung Jin Kim, Gyeonggi-do (KR); Mi-Sun Do, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 826 days.

(21) Appl. No.: 12/035,547

(22) Filed: Feb. 22, 2008

(65) Prior Publication Data

US 2009/0093266 A1    Apr. 9, 2009

(30) Foreign Application Priority Data

Oct. 4, 2007    (KR) .................. 10-2007-0099980

(51) Int. Cl.
*H04Q 7/20* (2006.01)
(52) U.S. Cl. ............... 455/7; 455/11.1; 455/17; 455/22; 455/422.1; 455/426.1; 370/315; 370/310; 370/321; 370/326; 370/328
(58) Field of Classification Search ............ 455/7, 11.1, 455/17, 22, 422.1, 403, 414.1–414.4, 550.1, 455/445, 426.1, 426.2; 370/315, 310, 321, 370/326, 328, 330, 329
See application file for complete search history.

(56) References Cited

U.S. PATENT DOCUMENTS

| | | | | |
|---|---|---|---|---|
| 7,145,885 | B1* | 12/2006 | Kimura et al. | 370/293 |
| 2006/0003703 | A1* | 1/2006 | Yahagi | 455/69 |
| 2007/0058577 | A1 | 3/2007 | Rubin | |
| 2008/0075094 | A1* | 3/2008 | Ahn et al. | 370/400 |
| 2008/0107073 | A1* | 5/2008 | Hart et al. | 370/330 |
| 2009/0217119 | A1* | 8/2009 | Zhang et al. | 714/748 |
| 2009/0245166 | A1* | 10/2009 | Okuda | 370/315 |
| 2010/0017672 | A1* | 1/2010 | Suga | 714/748 |

FOREIGN PATENT DOCUMENTS

| | | |
|---|---|---|
| KR | 10-2005-0084310 | 8/2005 |
| KR | 10-2007-0004370 | 1/2007 |

* cited by examiner

*Primary Examiner* — Keith Ferguson
(74) *Attorney, Agent, or Firm* — NSIP Law

(57) ABSTRACT

A structure of a data frame for transmitting data via a relay, and a transmission apparatus and a relay using the data frame are provided. The relay includes: a receiver to receive, from a transmission apparatus, first radio resource allocation information with respect to a first radio resource and second radio resource allocation information with respect to a second radio resource, and to receive first data from the transmission apparatus using the first radio resource allocation information; and a transmitter to transmit the received first data to a receiving apparatus using the second radio resource allocation information.

20 Claims, 7 Drawing Sheets

RELAY SYSTEM AND DATA FRAME STRUCTURE FOR THE RELAY SYSTEM

CROSS-REFERENCE TO RELATED APPLICATION

This application claims the benefit of Korean Patent Application No. 2007-99980, filed on Oct. 4, 2007 in the Korean Intellectual Property Office, the disclosure of which is incorporated herein by reference.

BACKGROUND OF THE INVENTION

1. Field of the Invention

Aspects of the present invention relate to a radio communication system transmitting data from a transmission apparatus to a receiving apparatus, more particularly, to a structure of a data frame for transmitting data via a relay, and a transmission apparatus and a relay using the data frame.

2. Description of the Related Art

With advances in radio communication networks, various services such as a video call and data transmission, in addition to a simple voice call, are provided to use in our everyday lives.

Communication quality in digital communication is determined according to strength of a transmitted signal including data, or a SINR (signal to interference and noise ratio). However, the strength of the transmitted signal including data varies due to characteristics of a radio channel over time. Accordingly, in a conventional mobile communication environment, due to a fading phenomenon, that is a radio channel varies over time, communication quality cannot be guaranteed for a radio channel using a specific service.

To solve the above problem, a technique establishing a predetermined signal to interference and noise ratio (SINR) and controlling the strength of the transmitted signal based on the SINR is provided. However, if a state of the radio channel varies very rapidly, communication quality cannot be guaranteed using such a technique.

To overcome the fading phenomenon, various diversity schemes are provided. Specifically, a spatial diversity technique, which transmits/receives data using a plurality of antennas spatially separated relatively far apart from each other, has been used as an effective and simple technique to overcome such fading phenomenon.

The spatial diversity technique can be used for a terminal having sufficient space for installation of the plurality of antennas such as an access point and a base station, however cannot be used for a terminal without sufficient space for installation of the plurality of antennas.

To solve such a problem, a data transmission scheme using a relay is provided. The relay receives data from a base station, and forwards the received data to a terminal, and the terminal may receive the data via a path whose channel condition is superior, among paths from the base station to the terminal or among paths from the relay to the terminal.

However, there is difficulty to transmit real data since a specific signaling process for determining an optimal path among the paths from the base station to the terminal or among paths from the relay to the terminal, and a data frame structure for determining the optimal path, are not provided.

SUMMARY OF THE INVENTION

Aspects of the present invention provide a relay receiving radio resource allocation information from a transmission apparatus, and transmitting data to a receiving apparatus using the received radio resource allocation information.

The present invention also provides a transmission apparatus allocating a radio resource for transmitting data from the transmission apparatus to a relay, and a radio resource for transmitting data from a relay to a receiving apparatus, and transmitting data to the receiving apparatus via the relay using the allocated radio resource.

To achieve the goal of the present invention and solve problems of a conventional art, there is provided a relay including: a receiver to receive, from a transmission apparatus, first radio resource allocation information with respect to a first radio resource and second radio resource allocation information with respect to a second radio resource, and to receive first data from the transmission apparatus using the first radio resource allocation information; and a transmitter to transmit the received first data to a receiving apparatus using the second radio resource allocation information.

According to an aspect of the present invention, there is provided a transmission apparatus including: a radio resource allocation unit to allocate a first radio resource and a second radio resource; a transmitter to transmit first radio resource allocation information with respect to the first radio resource and second radio resource allocation information with respect to the second radio resource to a relay, and to transmit first data to the relay using the first radio resource allocation information, and to transmit second data to the receiving apparatus using the second radio resource allocation information, wherein the first data is transmitted from the relay to the receiving apparatus using the second radio resource allocation information.

According to an aspect of the present invention, there is provided a computer-readable storage medium storing a data frame including: a first radio resource allocation information zone to include first radio resource allocation information with respect to a first radio resource for transmitting first data from a transmission apparatus to a relay; a second radio resource allocation information zone to include second radio resource allocation information with respect to a second radio resource for transmitting second data from the transmission apparatus to a receiving apparatus; and a data zone to store the first data and the second data, wherein the first data is transmitted from the relay to the receiving apparatus using the second radio resource allocation information.

According to an aspect of the present invention, in a relay transmission system with at least one relay to transmit data received from a transmission apparatus to a receiving apparatus, the at least one relay includes: a transmitter/receiver to receive data from transmission apparatus in a first time slot, to transmit the received data to the receiving apparatus in a second time slot, and to transfer from one time slot of the first and second time slots to the other time slot in a third time slot; and a control unit to control slot transfer of the transmitter/receiver, and the control unit controls the transmitter/receiver to not transmit/receive any data in the third time slot.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF EMBODIMENTS

Figure 1:
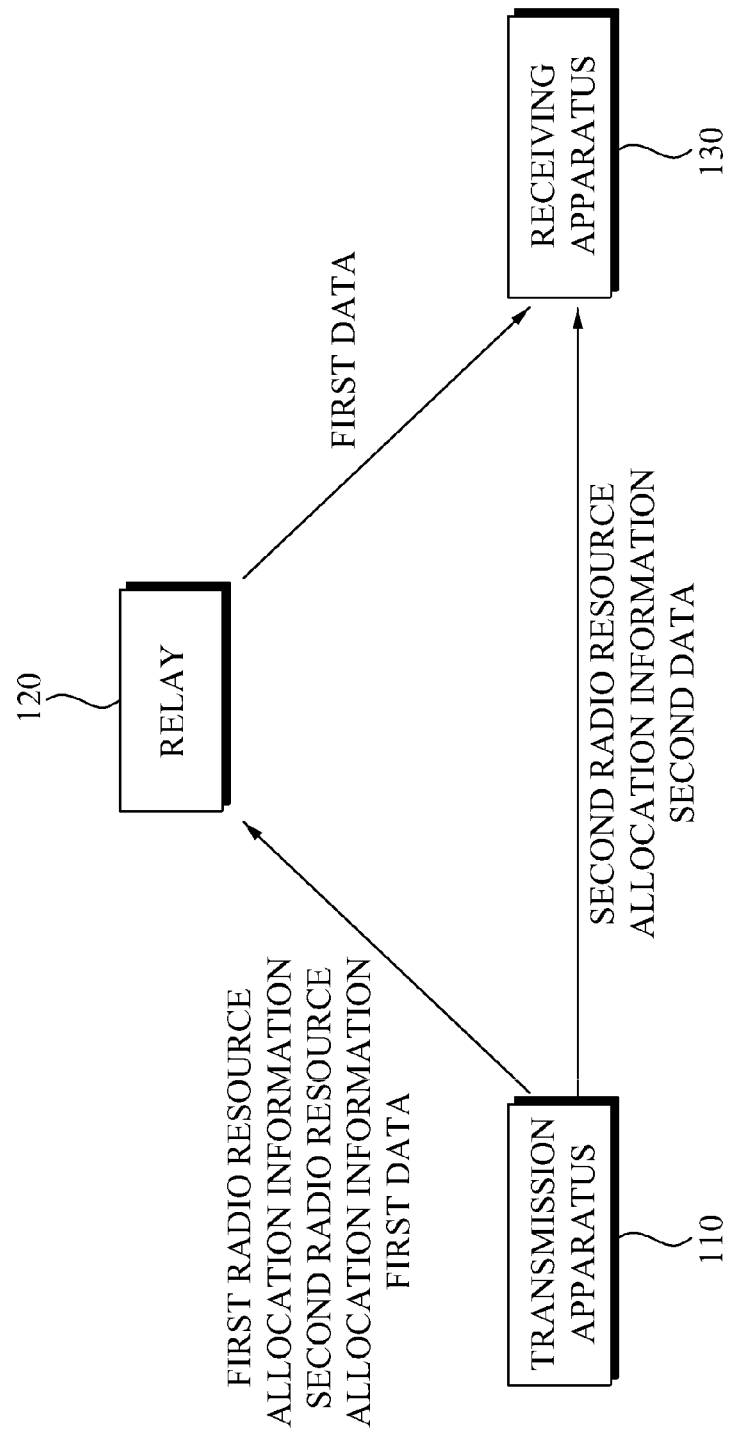
FIG. 1 is a diagram illustrating a relay system transmitting data via a relay according to an embodiment of the present invention.

Reference will now be made in detail to present embodiments of the present invention, examples of which are illustrated in the accompanying drawings, wherein like reference numerals refer to the like elements throughout. The exemplary embodiments are described below in order to explain the present invention by referring to the figures.

FIG. 1 is a diagram illustrating a relay system transmitting data via a relay according to an embodiment of the present invention. Hereinafter, the relay system will be described by referring to FIG. 1. The relay system according to the embodiment of the present invention includes a transmission apparatus 110, a relay 120, and a receiving apparatus 130.

The transmission apparatus 110 transmits first radio allocation information, second radio allocation information, and first data to the relay 120. The first radio resource allocation information includes a start time of the transmission of the first data within a downlink data frame where the first data is transmitted, a duration length of the transmission of the first data, and an identifier of the receiving apparatus 130 where the first data is transmitted.

The relay 120 receives the first radio resource allocation information with respect to a first radio resource and the second radio resource allocation information with respect to a second radio resource. The first data is received from the transmission apparatus using the first radio resource allocation information. The relay 120 transmits the received first data to the receiving apparatus 130 using the second radio resource allocation information.

The receiving apparatus 130 receives the second radio resource allocation information with respect to the second radio resource from the relay 120 or the transmission apparatus 110. The second radio resource allocation information may include a start time of transmission of second data within a downlink data frame where the second data is transmitted, and a duration length of the transmission of the second data. The second data is transmitted using the second radio resource, the second radio resource allocation information may include information about the second radio resource, and the receiving apparatus 130 may receive the second data using the second radio resource allocation information.

According to an embodiment of the present invention, the first data being received from the relay 120 in the receiving apparatus 130 may be identical to the second data being directly received from the transmission apparatus 110, or may be different from the second data.

Figure 2:
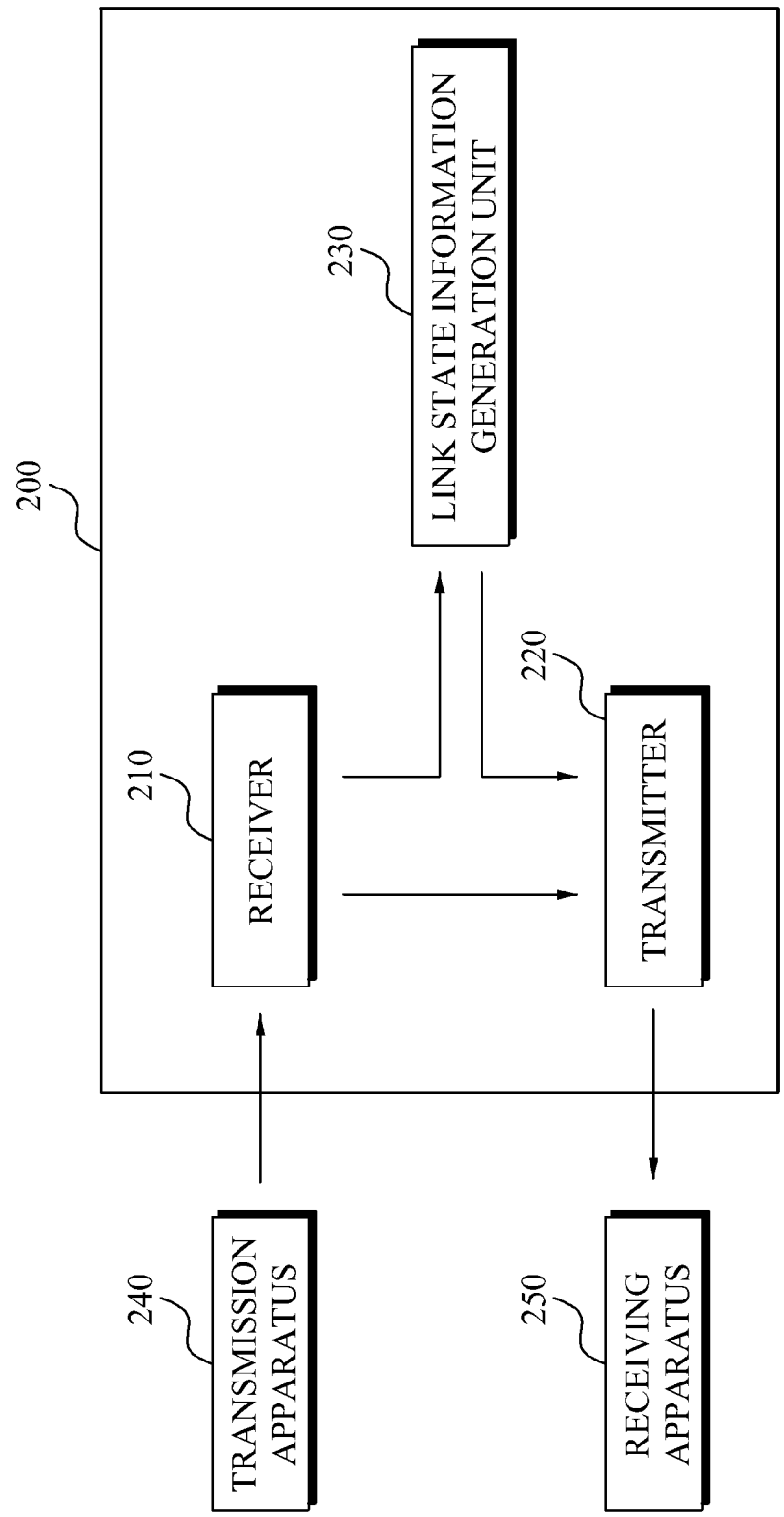
FIG. 2 is a block diagram illustrating a configuration of a relay according to an embodiment of the present invention.

FIG. 2 is a block diagram illustrating a configuration of a relay 200 according to an embodiment of the present invention. Hereinafter, the configuration of the relay 200 will be described by referring to FIG. 2. The relay 200 includes a receiver 210, a transmitter 220, and link state information generation unit 230.

The receiver 210 receives first radio resource allocation information with respect to a first radio resource and second radio resource allocation information with respect to a second radio resource from a transmission apparatus, and receives first data from the transmission apparatus using the first radio resource allocation information.

The first radio resource allocation information may include at least one of a start time of transmission of the first data within a downlink data frame where the first data is transmitted, a duration length of the transmission of the first data, and an identifier of the receiving apparatus 250 where the first data is transmitted from the relay 200. The receiver 210 may receive the first data using the start time of the transmission of the first data and the duration length of the transmission of the first data.

According to an embodiment of the present invention, the first radio resource allocation information or the second radio resource allocation information may be included in downlink map information element (DL MAP IE) defined in the Institute of Electrical and Electronics Engineers (IEEE) 802.16 standard, and the receiver 210 may receive the first radio resource allocation information included in the DL MAP IE.

The transmitter 220 transmits the received first data to the receiving apparatus 250 using the second radio resource allocation information.

The second radio resource allocation information may include at least one of a start time of transmission of the first data within a downlink data frame where the first data is transmitted from the relay 200 to the receiving apparatus 250, and a duration length of the transmission of the first data.

According to an embodiment of the present invention, the transmission apparatus 240 may directly transmit the second data to the receiving apparatus 250 using the second radio resource allocation information.

The link state information generation unit 230 generates link state information with respect to at least one link of radio links which connect between the transmission apparatus 240, the relay 200, and the receiving apparatus 250.

According to an embodiment of the present invention, the receiver 210 may receive third radio resource allocation information with respect to a third radio resource, and the transmitter 220 may transmit link state information, which is generated using the third radio resource allocation information, to the transmission apparatus 240.

According to an embodiment of the present invention, the third radio resource allocation information may be included in the DL MAP IE defined in IEEE 802.16 standard.

According to an embodiment of the present invention, the link state information generated in the link state information generation unit 230 may include whether an error with respect to a radio link occurs, or may include a signal to interference and noise ratio (SINR).

According to an embodiment of the present invention, the relay may further include an optimal transmission mode determination unit to determine an optimal transmission mode from a plurality of modes based on the received link state information.

The plurality of modes may include a first transmission mode and a second transmission mode. In the first transmission mode, the first data is transmitted to the receiving apparatus 250 via the relay 200, and the second data identical to the first data is directly transmitted to the receiving apparatus 240. In the second transmission mode, whole data is divided into first data and second data, the first data is transmitted to the receiving apparatus 250 via the relay 200, and the second data is directly transmitted to the receiving apparatus 240. The transmitter 220 may transmit determined optimal transmission mode to the transmission apparatus 240 or the receiving apparatus 250.

The transmitter 220 may transmit the determined optimal transmission mode to transmission apparatus 230 or to the receiving apparatus 250.

According to an embodiment of the present invention, the relay 200 may further include a transmission scheme determination unit to determine a modulation scheme or a channel coding scheme with respect to the first data or the second data being directly transmitted from the transmission apparatus 240 to the receiving apparatus 250 based on the received link state information.

Since the link state information varies over time, an optimal modulation scheme or an optimal channel coding scheme with respect to each data may differ depending on each data frame, the each data being included in each data frame to be transmitted. According to the present invention, an optimal modulation scheme or an optimal channel coding scheme with respect to each data included in each data frame may be determined by the relay 200.

The transmitter 220 transmits information about the determined modulation scheme or channel coding scheme to the transmission apparatus 240 or the receiving apparatus 250. The receiver 210 may receive data transmitted from the transmission apparatus 240 based on the determined modulation scheme information or channel coding scheme information, and the transmitter 220 may transmit data to the receiving apparatus 250 based on the determined modulation scheme information or channel coding scheme information.

Figure 3:
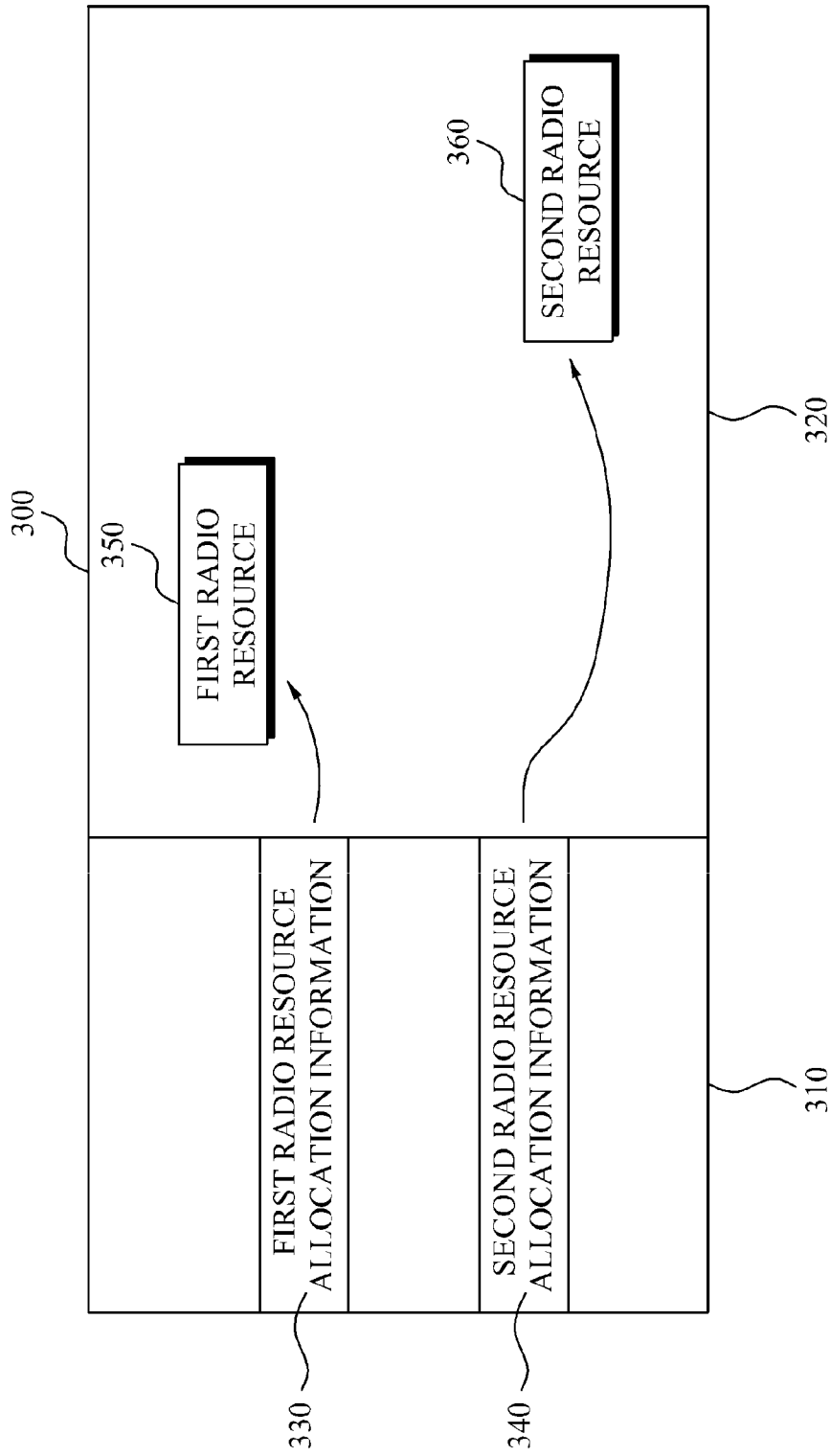
FIG. 3 is a diagram illustrating a structure of a downlink data frame according to an embodiment of the present invention.

FIG. 3 is a diagram illustrating a structure of a downlink data frame 300 according to an embodiment of the present invention. Hereinafter, the structure of the downlink data frame 300 will be described by referring to FIG. 3. The downlink data frame 300 includes first radio resource allocation information 330, second radio resource allocation information 340, a first radio resource 350, and a second radio resource 360.

A first data transmitted from a transmission apparatus to a relay is transmitted using the first radio resource 350 within the downlink data frame 300. The first radio resource allocation information 330 may include a start time of transmission of first data within the downlink data frame 300 where the first data is transmitted and a duration length of the transmission of the first data. The relay may receive the first data using the first radio resource allocation information 330. According to an embodiment of the present invention, the first radio resource allocation information may further include an identifier of the receiving apparatus receiving the first data.

The relay transmits the first data to the receiving apparatus using the second radio resource 360 within the downlink data frame. The second radio resource allocation information 340 may include a start time of transmission of second data within the downlink data frame 300 where the second data is transmitted, and a duration length of the transmission of the second data. According to an embodiment of the present invention, the first radio resource allocation information 330 and the second radio resource allocation information 340 are included in a system information transmission zone within the downlink data frame 300 to be transmitted, and the first radio resource 350 and the second radio resource 360 may be allocated to a data transmission zone 320. The relay receives the first data being transmitted using the first radio resource 350, and the received first data is transmitted to the receiving apparatus using the second radio resource 360.

According to an embodiment of the present invention, the transmission apparatus may directly transmit the second data using the second radio resource 360.

According to an embodiment of the present invention, the first data may be identical to the second data. The first data is transmitted from the transmission apparatus to the receiving apparatus via the relay, and the second data is directly transmitted from the transmission apparatus to the receiving apparatus.

According to another embodiment of the present invention, the first data and the second data may be different. The transmission apparatus divides while data required to be transmitted to the receiving apparatus into the first data and the second data. The first data is transmitted from the transmission apparatus to the receiving apparatus via the relay, and the second data is directly transmitted to the receiving apparatus.

According to an embodiment of the present invention, the system information transmission zone 310 may include transmission scheme information zone including a modulation scheme information or a channel coding scheme information with respect to at least one radio link of radio links which connect between the transmission apparatus, the relay, and the receiving apparatus. The transmission apparatus and the relay may receive/transmit the first data or the second data based on the modulation scheme information or the channel coding scheme information.

Figure 4:
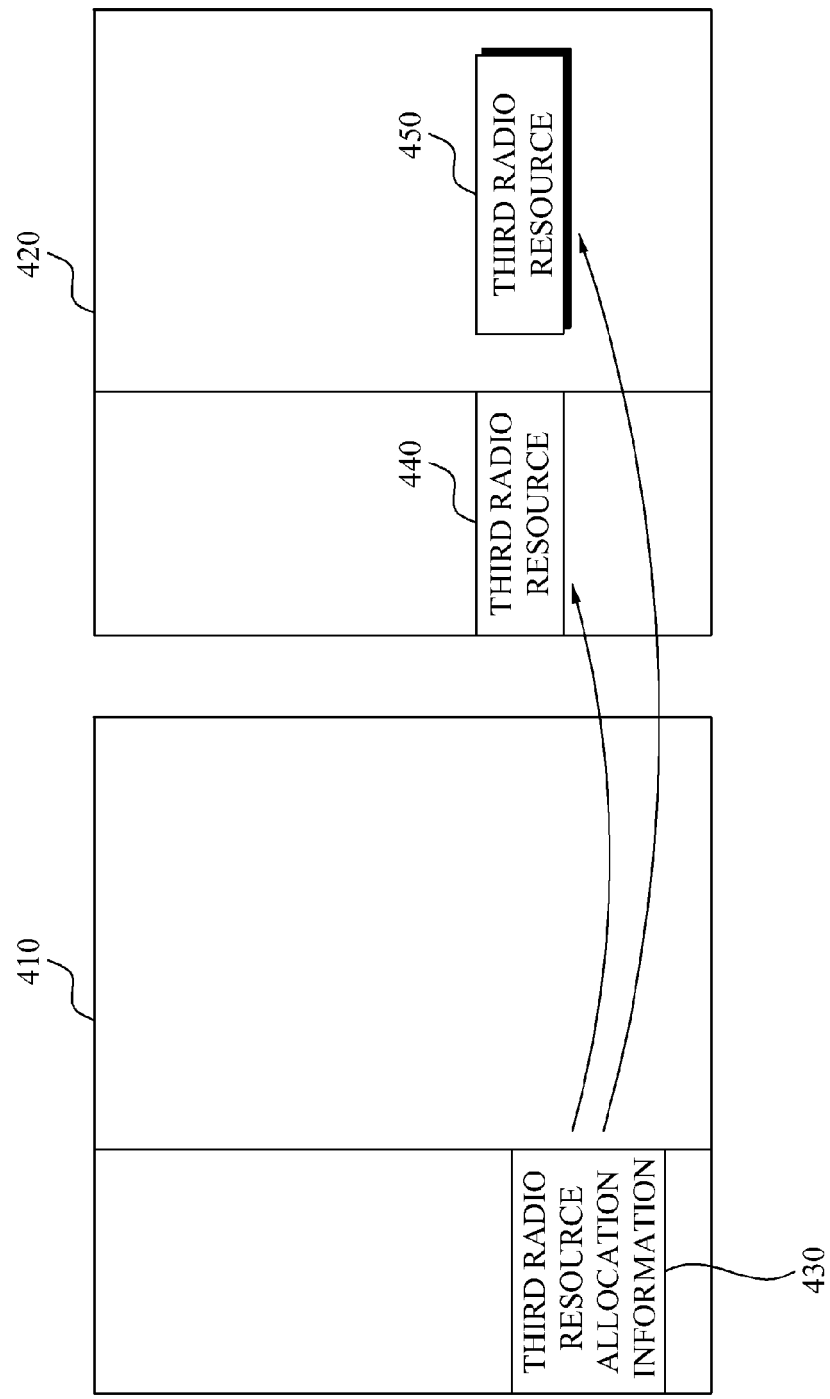
FIG. 4 is a diagram illustrating a structure of an uplink data frame associated with a downlink data frame according to an embodiment of the present invention.

FIG. 4 is a diagram illustrating a structure of an uplink data frame associated with a downlink data frame 410 according to an embodiment of the present invention. Hereinafter, the structure of the uplink data frame associated with the downlink data frame 410 will be described by referring to FIG. 4. The uplink data frame according to the present invention includes third radio resources 440 and 450 associated with third radio resource allocation information 430 of the downlink data frame 410.

Link state information is transmitted from a relay or a receiving apparatus to a transmission apparatus using the third radio resources 440 and 450 within the uplink data frame 420. The relay or the receiving apparatus receives the third radio resource allocation information 430 included in the downlink data frame 410, and transmits the received link state information to the transmission apparatus using the third radio resources 440 and 450.

According to an embodiment of the present invention, the link state information includes link state information with respect to at least one radio link of radio links which connect between the transmission apparatus, the relay, and the receiving apparatus.

According to an embodiment of the present invention, the third radio resource allocation information 430 may be included in a DL MAP IE defined in the IEEE 802.16 standard.

Figure 5:
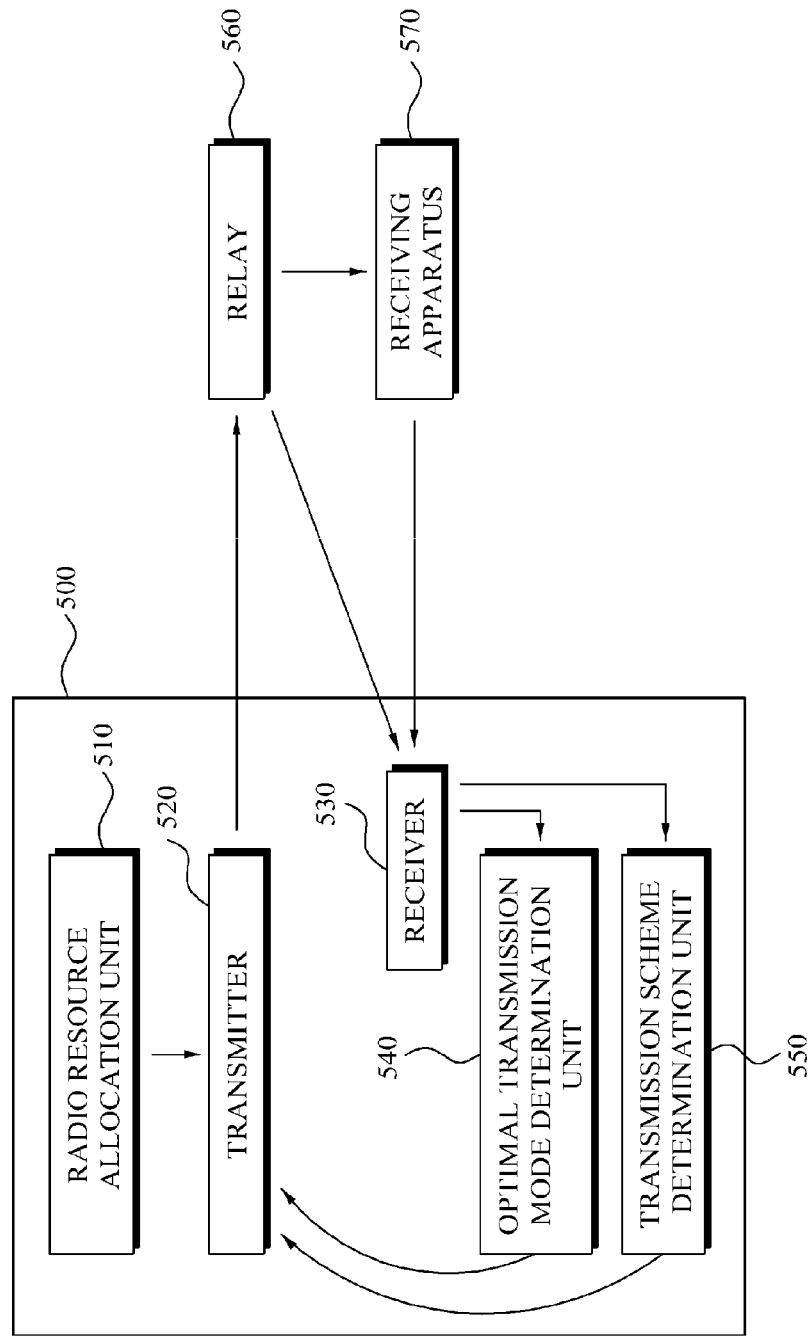
FIG. 5 is a block diagram illustrating a configuration of a transmission apparatus according to an embodiment of the present invention.

FIG. 5 is a block diagram illustrating a configuration of a transmission apparatus 500 according to an embodiment of the present invention. Hereinafter, the configuration of the transmission apparatus 500 will be described by referring to FIG. 5. The transmission apparatus 500 includes a radio resource allocation unit 510, a transmitter 520, a receiver 530, an optimal transmission mode determination unit 540, and a transmission scheme determination unit 550.

The radio resource allocation unit 510 allocates a first radio resource and a second radio resource within a downlink data frame.

The transmitter 520 transmits first radio resource allocation information with respect to the first radio resource and second radio resource allocation information with respect to the second radio resource to a relay 560, and transmits the first data to the relay 560 using the first radio resource allocation information. The second radio resource allocation information is transmitted to the receiving apparatus 570, and the second data is transmitted to the receiving apparatus 570 using the second radio resource allocation information.

According to an embodiment of the present invention, the first radio resource allocation information may include a start time of the transmission of the first data within a downlink data frame where the first data is transmitted, a duration length of the transmission of the first data, and an identifier of the receiving apparatus 570 where the first data is transmitted, and the second radio resource allocation information may include a start time of the transmission of the second data within a downlink data frame where the second data is transmitted, a duration length of the transmission of the second data.

The first data is transmitted from the relay 560 to the receiving apparatus 570 using the second radio resource allocation information. According to an embodiment of the present invention, the transmission apparatus 500 may transmit the first data or the second data to the receiving apparatus 570 using the second radio resource allocation information.

The relay 560 receives the first data using the first radio resource allocation information, and transmits the second data to the receiving apparatus 570 using the second radio resource allocation information. The receiving apparatus 570 may receive the second data using the second radio resource allocation information.

According to an embodiment of the present invention, the transmitter 520 may include each of the first and second radio resource allocation information in a DL MAP IE defined in the IEEE 802.16 standard.

According to an embodiment of the present invention, the radio resource allocation unit 510 allocates a third radio resource to an uplink from the relay 560 or from the receiving apparatus 570 to the transmission apparatus 500. The transmitter 520 transmits third radio resource allocation information with respect to the third radio resource to the relay 560 or the receiving apparatus 570.

The receiver 530 receives at least one link state information of radio links which connect between the transmission apparatus 500, the relay 560, and the receiving apparatus 570 using the third radio resource allocation information.

According to an embodiment of the present invention, the link state information may include whether an error with respect to a radio link occurs, or may include a signal to interference and noise ratio (SINR).

The optimal transmission mode determination unit 540 determines an optimal transmission mode from a plurality of modes which are used to transmit data from the transmission apparatus 500 to the receiving apparatus 570 based on the received link state information.

According to an embodiment of the present invention, in the first transmission mode, the first data is transmitted from the transmission apparatus 500 to the receiving apparatus 570 via the relay 560, and the second data, identical to the first data, is transmitted from transmission apparatus 500 to the receiving apparatus 570 directly. And in the second transmission mode, the first data is transmitted from transmission apparatus 500 to the receiving apparatus 570 via the relay 560, and the second data is transmitted from transmission apparatus 500 to the receiving apparatus 570 directly, tho whole data is divided into the first data and the second data.

According to an embodiment of the present invention, the transmitter 520 may transmit the determined optimal transmission mode to the relay 560 or the receiving apparatus 570, and may transmit the first data and the second data based on the determined optimal transmission mode.

The transmission scheme determination unit 550 determines a modulation scheme or a channel coding scheme with respect to a radio link which connects between the transmission apparatus 500, the relay 560, and the receiving apparatus 570, based on the receive link state information. The optimal data modulation scheme or channel coding scheme may be determined based on the link state information that varies over time. According to an embodiment of the present invention, the transmitter 520 may transmit information about the determined modulation scheme or channel coding scheme to the relay 560 and the receiving apparatus 570, thereby transmitting the first data or the second data based on the information of determined modulation scheme or channel coding scheme.

Figure 6:
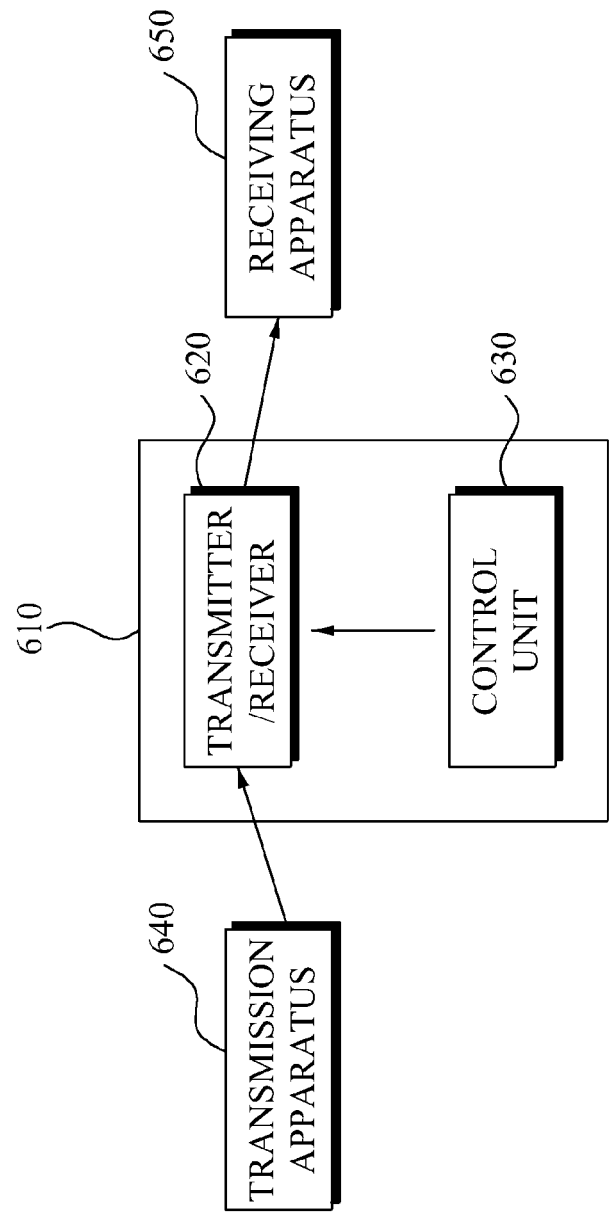
FIG. 6 is a block diagram illustrating a configuration of a relay which does not receive/transmit data in a specific time slot.

FIG. 6 is a block diagram illustrating a configuration of a relay 610 which does not receive/transmit data in a specific time slot. Hereinafter, the configuration of the relay 610 will be described by referring to FIG. 6. The relay 610 includes a transmitter/receiver 620 and a control unit 630.

The transmitter/receiver 620 receives data from a transmission apparatus 640 in a first time slot, and transmits the received data to a receiving apparatus 650 in a second time slot. In a third time slot, The transmitter/receiver 620 transfer from one time slot of the first and second time slots to the other time slot. In a third time slot, the control unit controls the transmitter/receiver 620 to not receive/transmit any data.

The transmitter/receiver 620 operates according to a receiving mode in the first time slot, and operates according to a transmission mode in the second time slot. When the transmitter/receiver 620 transfer from the transmission mode to the receiving mode or from the receiving mode to the transmission mode, a time delay occurs. The transmitter/receiver 620 may not transmit/receive data in a delay time slot while modes are changing. Therefore, the transmission apparatus 640 may transmit data to the relay 610 by considering a third time slot when the relay 610 transfer from one time slot of the first and second time slots to the other time slot.

According to an embodiment of the present invention, a plurality of relays connects to the transmission apparatus 640, and the transmission apparatus 640 may transmit data to the receiving apparatus 650, via at least one relay 610 from the plurality of relays. The time delay to transfer from a transmission mode to a receiving mode differs depending on performance of the transmitter/receiver 620 of each relay 610. Accordingly, each relay 610 individually determines the third time slot.

Figure 7:
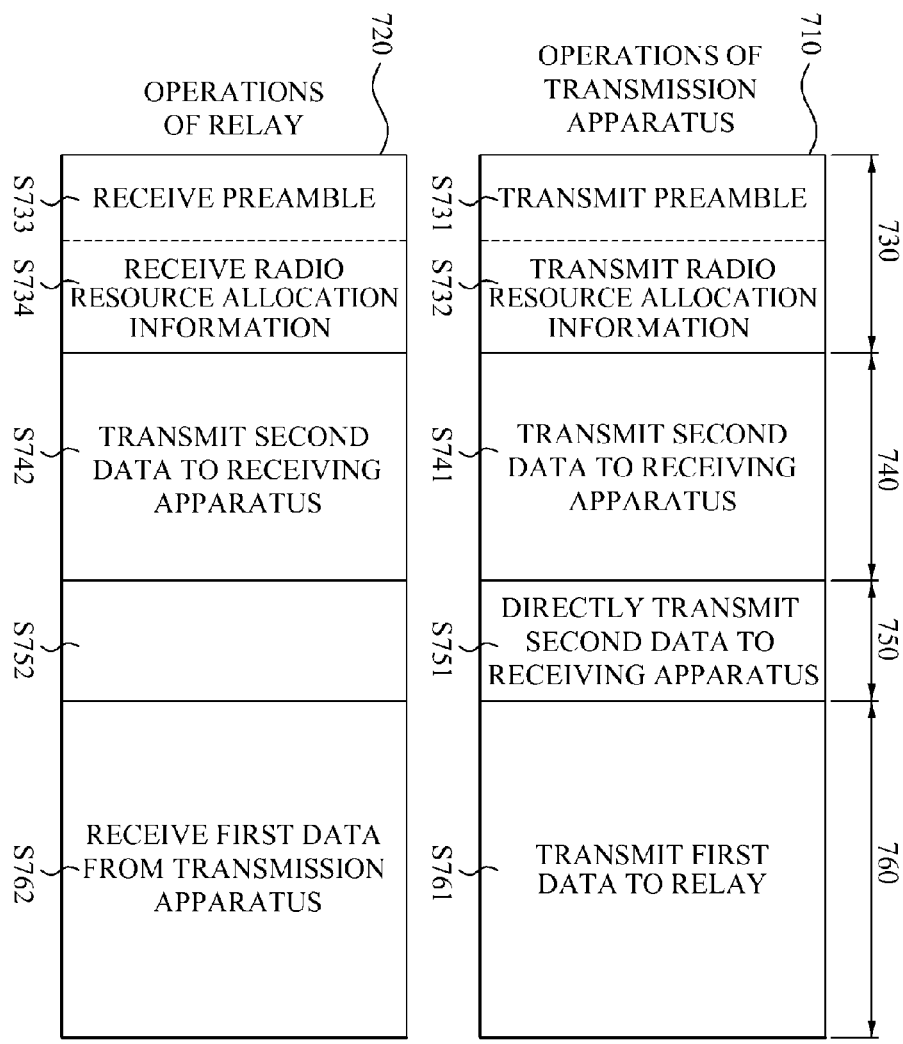
FIG. 7 is a diagram illustrating operations of a transmission apparatus and a relay according to an embodiment of the present invention.

FIG. 7 is a diagram illustrating operations 710 of a transmission apparatus and operations 720 of a relay according to an embodiment of the present invention.

In a system information transmission zone 730, a transmission apparatus transmits a preamble in operation S731 and transmit radio resource allocation information in operation S732. According to an embodiment of the present invention, the relay receives the preamble in operation S733 to synchronize with the transmission apparatus. The relay receives radio resource allocation information in operation S734, thereby recognizes a start time and a duration length of transmission of a first data or a second data within a downlink data frame.

The transmission apparatus directly transmits the second data to the receiving apparatus in operation S741 in a first time slot 740. The relay transmits the first data to the receiving apparatus in operation S742 in the first time slot 740. The first data of a present downlink data frame may be the second data of a previous downlink data frame, According to an embodiment of the present invention, the transmission apparatus may directly transmit the second data to a receiving apparatus 741, which directly connects to the transmission apparatus, in the first time slot 740. The relay may transmit the first data to a receiving apparatus 742, which connects to the receiving apparatus via the relay, in the first time slot 740.

The transmission apparatus may directly transmit the second data to a receiving apparatus in operation S751 in a third time slot 750. The relay does not transmit/receive data in operation S752 in the third time slot 750. The third time slot 750 may be determined depending on performance of each relay.

The transmission apparatus may transmit the first data to the relay in operation S761 in the second time slot 760. The relay receives the first data from the transmission apparatus in operation S762 in the second time slot 760.

According to an embodiment of the present invention, radio resource allocation information may include a start point and a length of the first time slot 740, the second time slot 760, and the third time slot 750. The relay may receive/transmit the first data using information about each time slot.

The method for programming data of a memory cell according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

According to the above described embodiments, there is provided a relay receiving radio resource allocation information from a transmission apparatus, and transmitting data to a receiving apparatus using the received radio resource allocation information.

Also, according to the above described embodiments, there is provided a transmission apparatus allocating a radio resource for transmitting data from the transmission apparatus to a relay, and a radio resource for transmitting data from a relay to a receiving apparatus, and transmitting data to the receiving apparatus via the relay using the allocated radio resource.

Although a few embodiments of the present invention have been shown and described, it would be appreciated by those skilled in the art that changes may be made to these embodiments without departing from the principles and spirit of the invention, the scope of which is defined by the claims and their equivalents.

What is claimed is:

1. A relay comprising:
a receiver to receive, from a transmission apparatus, first radio resource allocation information with respect to a first radio resource and second radio resource allocation information with respect to a second radio resource, and to receive first data from the transmission apparatus using the first radio resource allocation information; and
a transmitter to transmit the received first data to a receiving apparatus using the second radio resource allocation information.

2. The relay of claim 1, wherein each of the first and second radio resource allocation information comprises at least one of a start time of the transmission of the first data, a duration length of the transmission of the first data, and an identifier of the receiving apparatus.

3. The relay of claim 1, wherein the receiver receives each of the first and second radio resource allocation information included in a download link map information element (DL MAP IE) defined in the Institute of Electrical and Electronics Engineers (IEEE) 802.16 standard.

4. The relay of claim 1, further comprising:
a link state information generation unit to generate link state information with respect to at least one of radio links which connect the transmission apparatus, the relay, and the receiving apparatus,
wherein the receiver receives third radio resource allocation information with respect to a third radio resource, and the transmitter transmits the generated link state information to the transmission apparatus using the third radio resource allocation information.

5. The relay of claim 4, wherein the link state information comprises information about whether an error with respect to the radio link occurs, or a signal to interference and noise ratio (SINR).

6. The relay of claim 1, wherein the receiver receives link state information with respect to the at least one of the radio links which connect between the transmission apparatus, the relay, and the receiving apparatus,
the relay further comprises an optimal transmission mode determination unit to determine an optimal transmission mode from a plurality of modes based on the received link state information, and
the plurality of modes comprise at least one of a first transmission mode and a second transmission mode, the first transmission mode transmitting the first data to the receiving apparatus via the relay and directly transmitting the second data identical to the first data to the receiving apparatus, and the second transmission mode dividing whole data into first data and second data, transmitting the first data to the receiving apparatus via the relay, and directly transmitting the second data to the receiving apparatus.

7. The relay of claim 1, wherein the receiver receives link state information with respect to at least one of radio links which connect the transmission apparatus, the relay, and a receiving apparatus, and the relay further comprises a transmission scheme determination unit to determine a modulation scheme or a channel coding scheme with respect to the first data or the second data being directly transmitted from the transmission apparatus to the receiving apparatus based on the received link state information, and the transmitter transmits information about the determined modulation scheme or channel coding scheme to the transmission apparatus or the receiving apparatus.

8. A transmission apparatus, comprising:
a radio resource allocation unit to allocate a first radio resource and a second radio resource;
a transmitter to transmit first radio resource allocation information with respect to the first radio resource and second radio resource allocation information with respect to the second radio resource to a relay, and to transmit first data to the relay using the first radio resource allocation information, and to transmit second data to a receiving apparatus using the second radio resource allocation information,
wherein the first data is transmitted from the relay to the receiving apparatus using the second radio resource allocation information.

9. The transmission apparatus of claim 8, wherein each of the first and second radio resource allocation information comprises at least one of a start time of the transmission of the first data, a duration length of the transmission of the first data, and an identifier of the receiving apparatus.

10. The transmission apparatus of claim 8, wherein the transmitter transmits each of the first and second radio resource allocation information by including each of the first and second radio resource allocation information in a download link map information element (DL-MAP IE) defined in the Institute of Electrical and Electronics Engineers (IEEE) 802.16 standard.

11. The transmission apparatus of claim 8, wherein the radio resource allocation unit allocates a third radio resource, and the transmitter transmits third radio resource allocation information with respect to the allocated third radio resource to the receiving apparatus or the relay, and the radio resource allocation unit further comprises:
a receiver to receive at least one link state information of radio links which connect the transmission apparatus, the relay, and the receiving apparatus using the third radio resource allocation information.

12. The transmission apparatus of claim 11, wherein the link state information comprises information about whether an error with respect to the radio link occurs, or a signal to interference and noise ratio (SINR).

13. The transmission apparatus of claim 11, further comprising:
an optimal transmission mode determination unit to determine an optimal transmission mode from a plurality of modes based on the received link state information,
wherein the plurality of modes comprise at least one of a first transmission mode and a second transmission mode, the first transmission mode transmitting the first data to the receiving apparatus via the relay, and directly transmitting the second data identical to the first data to the receiver, and the second transmission mode dividing whole data into the first data and the second data, transmitting the first data to the receiving apparatus via the relay, and directly transmitting the second data to the receiving apparatus.

14. The transmission apparatus of claim 11, further comprising:
a transmission scheme determination unit to determine a modulation scheme or a channel coding scheme with respect to the radio link based on the link state information,
wherein the transmitter transmits information about the determined modulation scheme or channel coding scheme to the relay and the receiving apparatus, and transmits the first data or the second data based on the determined modulation scheme or channel coding scheme.

15. A non transitory computer-readable storage medium storing a data frame, the computer-readable storage medium comprising:
a first radio resource allocation information zone to include first radio resource allocation information with respect to a first radio resource for transmitting first data from a transmission apparatus to a relay;
a second radio resource allocation information zone to include second radio resource allocation information with respect to a second radio resource for transmitting second data from the transmission apparatus to a receiving apparatus; and
a data zone to store the first data and the second data,
wherein the first data is transmitted from the relay to the receiving apparatus using the second radio resource allocation information.

16. The computer-readable storage medium of claim 15, further comprising:
a third radio resource allocation information zone to include third radio resource allocation information with respect to a third radio resource, the third radio resource transmitting link state information about at least one radio link of radio links which connect between the transmission apparatus, the relay, and the receiving apparatus,
wherein the link state information is transmitted to the transmission apparatus using the third radio resource allocation information.

17. The computer-readable storage medium of claim 15, further comprising:
a transmission scheme information zone to include a modulation scheme or a channel coding scheme with respect to the radio link,
wherein the transmission apparatus and the relay transmit the first data or the second data based on the modulation scheme or channel coding scheme.

18. The computer-readable storage medium of claim 15, wherein each of the first and second radio resource allocation information zones is included in a download link map information element (DL-MAP IE) defined in the Institute of Electrical and Electronics Engineers (IEEE) 802.16 standard.

19. A relay transmission system with at least one relay to transmit data received from a transmission apparatus to a receiving apparatus, wherein the at least one relay comprises:
a transmitter/receiver to receive data from transmission apparatus in a first time slot, to transmit the received data to the receiving apparatus in a second time slot, and to transfer from one time slot of the first and second time slots to the other time slot in a third time slot; and
a control unit to control slot transfer of the transmitter/receiver, and
the control unit controls the transmitter/receiver to not transmit/receive any data in the third time slot.

20. The relay system of claim 19, wherein the at least one relay individually determines the third time slot.

* * * * *